United States Patent [19]

Aoki et al.

[11] Patent Number: 4,972,005

[45] Date of Patent: Nov. 20, 1990

[54] ULTRAVIOLET-CURABLE COMPOSITION

[75] Inventors: Hisashi Aoki; Yasuaki Hara, both of Annaka, Japan

[73] Assignee: Shin-Etsu Chemical Co., Ltd., Tokyo, Japan

[21] Appl. No.: 178,317

[22] Filed: Apr. 6, 1988

[30] Foreign Application Priority Data

Apr. 7, 1987 [JP] Japan .................................. 62-85467

[51] Int. Cl.$^5$ .............................................. C08G 77/20
[52] U.S. Cl. ........................................ 522/99; 528/32
[58] Field of Search ............................ 522/99; 528/32

[56] References Cited

U.S. PATENT DOCUMENTS 4,355,147 10/1982 Deichert et al. ..................... 522/99
4,585,670 4/1986 Liu ....................................... 522/99

FOREIGN PATENT DOCUMENTS 3117024 5/1988 Japan ..................................... 522/99

*Primary Examiner*—Marion C. McCamish
*Assistant Examiner*—Susan Berman
*Attorney, Agent, or Firm*—Birch, Stewart, Kolasch & Birch

[57] ABSTRACT

Disclosed herein is an ultraviolet-curable organopolysiloxane composition which provides a cured film having improved brittleness, hardness, scratch resistance, and durability. The composition is composed of an acrylic-functional organopolysiloxane containing phenylsiloxane units and siloxane units having a specific acrylic functional group, a specific acrylate or methacrylate, and a photoinitiator.

10 Claims, No Drawings

ULTRAVIOLET-CURABLE COMPOSITION

BACKGROUND OF THE INVENTION

1. Field of the Invention

The present invention relates to an ultraviolet-curable composition which can provide a cured film superior in hardness, scratch resistance, and durability.

2. Description of the Prior Art

A variety of ultraviolet-curable organopolysiloxane compositions have been proposed and put to practical use. They include, for example, the one which comprises an acrylic-functional silicone resin (Japanese Patent Laid-open No. 111330/1986) and the one which comprises colloidal silica, polyfunctional acrylate monomer, and a hydrolyzate of acrylate silane (Japanese Patent Laid-open No. 1756/1983). The former has a disadvantage in that it provides a cured film which is brittle and poor in scratch resistance. The latter provides a cured film which is hard and superior in wear resistance but is poor in flexibility, heat resistance, and weather resistance.

SUMMARY OF THE INVENTION

The present invention was completed to eliminate the above-mentioned disadvantages. Accordingly, it is an object of the present invention to provide an ultraviolet-curable organopolysiloxane composition which can provide a cured film having improved brittleness, hardness, scratch resistance, and durability.

To achieve the above-mentioned object, the present inventors carried out a series of researches which led to the finding that it is possible to obtain an odorless, clear, one-pack type ultraviolet-curable liquid composition which is easy to handle and readily cures upon exposure to ultraviolet light, if an acrylic-functional organopolysiloxane containing a phenylsiloxane unit and a siloxane unit having a specific acrylic functional group represented by formula (1) (mentioned later) is combined with a specific acrylate or methacrylate represented by formula (2) (mentioned later). It was also found that the composition provides a cured product which has high hardness and strength and is superior in scratch resistance, durability, solvent resistance, flexibility, and heat resistance. On account of these characteristic properties, the composition finds use as a coating agent for gaskets, solder resist for FPC, coating agent for optical fiber, hard coating agent for plastic substrates, and resist for plating.

The acrylic-functional organopolysiloxane alone is not suitable for use, for example, as a coating agent for the surface protection of plastics, because it lacks scratch resistance, as shown in Examples and Comparative Examples given later. In addition, it is not suitable for use, for example, as a hard coating which is required to have a pencil hardness of 4H or higher. On the other hand, the acrylate or methacrylate of formula (2) used alone is not satisfactory in heat resistance, weather resistance, flexibility, and soldering resistance. It was found that an ultraviolet-curable composition having the above-mentioned superior characteristics is obtained when the two components of compound (A) and compound (B) shown below are combined with each other. The present invention was completed on the basis of these findings.

Accordingly, the present invention provides an ultraviolet-curable composition which comprises:

(A) an acrylic-functional organopolysiloxane containing at least one phenyl group-containing siloxane unit and at least one acrylic-functional siloxane unit represented by formula (1) below

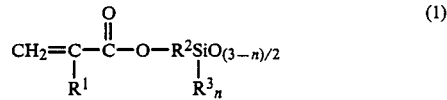

(where $R^1$ denotes a hydrogen atom or methyl group; $R^2$ denotes a substituted or unsubstituted divalent hydrocarbon group having 1 to 12 carbon atoms; $R^3$ denotes a substituted or unsubstituted monovalent hydrocarbon group having 1 to 12 carbon atoms; and n is a numeral of 0, 1, or 2.)

(B) an acrylate or methacrylate represented by formula (2) below

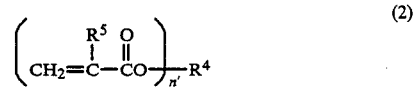

(where $R^4$ denotes a polyhydric alcohol residue or a residue of an ester composed of a polyhydric alcohol and a polybasic acid; $R^5$ denotes a hydrogen atom or methyl group; and $n'$ denotes an integer of 1 to 6.) and (C) a photoinitiator.

DETAILED DESCRIPTION OF THE INVENTION

The ultraviolet-curable composition of the present invention contains an acrylic-functional organopolysiloxane as component (A) which contains at least one acrylic-functional siloxane unit represented by formula (1) below

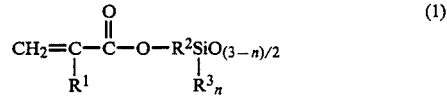

In formula (1), $R^1$ denotes a hydrogen atom or methyl group. $R^2$ denotes a substituted or unsubstituted divalent hydrocarbon group having 1 to 12 carbon atoms. It includes alkylene groups such as methylene, ethylene, triethylene, and tetramethylene. $R^3$ denotes a substituted or unsubstituted monovalent hydrocarbon group having 1 to 12 carbon atoms. It includes alkyl groups such as methyl, ethyl, propyl, and butyl groups; alkenyl groups such as vinyl and allyl groups; aryl groups such as phenyl and tolyl groups; cycloalkyl groups such as cyclohexyl group; and these groups with a part or all of the hydrogen atom connected to the carbon atom being substituted by halogen atoms or cyano groups (e.g., chloromethyl group, trifluoropropyl group, and cyanoethyl group).

The acrylic-functional organopolysiloxane as component (A) should contain at least one acrylic-functional siloxane unit (or 0.1 to 50 mole %, preferably 2 to 20 mole %) in all of the siloxane units. With the content less than 0.1 mole %, the ultraviolet-curable composition is slow in curing, and with the content in excess of 50 mole %, the ultraviolet-curable composition tends to lack flexibility and impact resistance.

Further, the component (A) should contain a phenyl group-containing siloxane unit as an essential unit in addition to the above-mentioned acrylic-functional siloxane unit. The phenyl group-containing siloxane unit can be represented by following formula (3) or (4)

$$PhR_n^6SiO_{\frac{3-n}{2}} \quad (3)$$

$$Ph_2R_m^6SiO_{\frac{3-m}{2}} \quad (4)$$

wherein Ph represents a phenyl group, $R^6$ represents the same or different, substituted or unsubstituted monovalent hydrocarbon groups having 1 to 12 carbon atoms, preferably methyl group, and n is 0, 1 or 2 and m is 0 or 1. It includes diphenylsiloxane unit, phenylsiloxane unit, methylphenyl siloxane unit, diphenylmethylsilyl-terminated unit and phenyldimethylsilyl-terminated unit. The amount of the phenyl group-containing siloxane unit should be at least one unit or 0.1 to 85 mole %, preferably 10 to 60 mole %, in all of the siloxane units. The phenyl group-containing siloxane unit renders the composition curable with a short exposure and improves the surface tackiness.

Component (A) may contain other organosiloxane units. They include, for example, dimethylsiloxane unit, methylsiloxane unit, methylvinylsiloxane unit, trimethylsilyl-terminated unit, and dimethylvinylsilyl-terminated unit, and vinylsiloxane unit. The amount of these units may be 15 to 90 mole %, preferably 30 to 70 mole %.

The acrylic-functional organopolysiloxane as component (A) is not specifically limited in molecular weight and viscosity. However, the preferred viscosity is 30 to 100,000 centistokes (cSt) at 25° C.

Examples of the acrylic-functional organopolysiloxane as component (A) include the following.

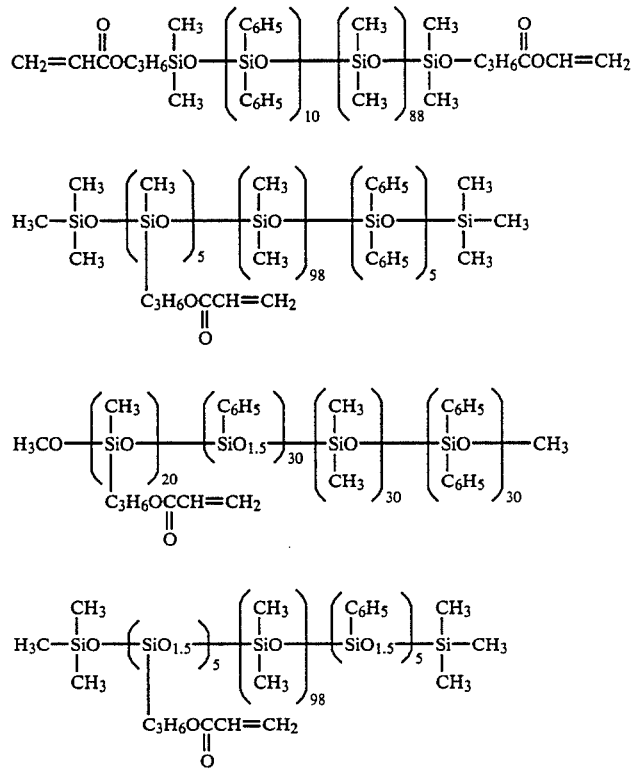

The acrylate or methacrylate as component (B) is represented by the formula (2) below.

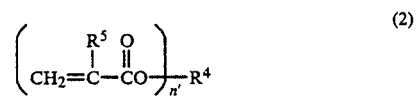

where $R^4$ denotes a polyhydric alcohol residue, or a residue of an ester composed of a polyhydric alcohol and a polybasic acid; $R^5$ denotes a hydrogen atom or methyl group; and n' denotes an integer of 1 to 6.

The acrylate or methacrylate having as $R^4$ a polyhydric alcohol residue can be produced by the esterification reaction of a polyhydric alcohol and acrylic acid or methacrylic acid under any known conditions.

Examples of the polyhydric alcohols include ethylene glycol, diethylene glycol, 2,2,4-trimethyl-1,3-pentanediol, dipropylene glycol, propylene glycol, polypropylene glycol having an average molecular weight of about 150 to 600, triethylene glycol, 1,4-cyclohexane dimethanol, neopentyl glycol, 2,2-dimethyl-3-hydroxylpropyl, 2,2-dimethyl-3-hydroxypropanate, polyethylene glycol having an average molecular weight of about 150 to 600, 2,2-bis[4-(2-hydroxyethoxy)phenyl]propane, 2,2-bis-[4-(2-hydroxypropoxy)phenyl]propane, 2,3-butanediol, tetraethylene glycol, 2,2-bis(4-hydroxyphenyl)propane, glycerin, trimethylpropane, 1,4-butanediol, polycaprolactone ester of trimethylolpropane containing about 1.5 equivalents of caprolactone, polycaprolactone ester of trimethylpropane containing about 3.6 equivalents of caprolactone, 2-ethyl-1,3-hexanediol, 1,5-pentanediol, tripropylene glycol, 2,2-bis(4-hydroxycyclohexyl)propane, 1,2,6-hexanetriol, 1,3- propanediol, and 1,6-hexanediol. They are used alone or in combination with one another.

The acrylate or methacrylate having a polyhydric alcohol residue is not specifically limited. It includes, for example, diethylene glycol diacrylate and dimethacrylate, tetraethylene glycol diacrylate and dimethacrylate, trimethylolpropane triacrylate and trimethacrylate, and pentaerythriol triacrylate and trimethacrylate.

In the case where $R^4$ is an ester residue composed of a polyhydric alcohol and a polybasic acid, the acrylate or methacrylate is prepared from a polyhydric alcohol exemplified below and a polybasic acid exemplified below. Examples of the polyhydric alcohol include ethylene glycol, 1,2-propylene glycol, 1,6-hexanediol, glycerin, trimethylolpropane, 1,2,6-hexanetriol, sorbitol, pentaerythriol, diethylene glycol, triethylene glycol, tetraethylene glycol, polyethylene glycol, and dipropylene glycol. Examples of the polybasic acid include phthalic acid, tetrahydrophthalic acid, hexahydrophthalic acid, isophthalic acid, terephthalic acid, himic acid, succinic acid, adipic acid, dodecanoic acid, sebacic acid, maleic acid, itaconic acid, fumaric acid, pyromellitic acid, and trimellitic acid, and anhydrides thereof. The ester reside $R^4$ is not required to be composed of one polyhydric alcohol and one polybasic acid; but it may be composed of two or more polyhydric alcohol and polybasic acids.

Examples of the polyester acrylate and methacrylate are shown below.

benzoin derivative disclosed in Japanese Patent Laid-open No. 44643/1979.

The above-mentioned photoinitiators may be used alone or in combination with one another. The less the amount of the photoinitiator, the slower the curing rate of the composition. However, the curing rate does not necessarily increase in proportion to the amount of the photoinitiator. An excess amount is economically disadvantageous. The adequate amount of photoinitiator as component (C) should be 0.1 to 10 parts by weight, preferably 1 to 4 parts by weight, for 100 parts by weight of the total amount of components (A) and (B).

In the meantime, the composition of the present invention may be incorporated with a variety of substances and compounds according to the desired properties and intended use of the cured product. These additives include a polymerization inhibitor (such as hydroquinone and t-butylhydroquinone), a pigment (such as phthalocyanine blue, phthalocyanine green, and titanium white), and thickener (such as silica, calcium carbonate, kaolin clay, and colloidal silica). In addition, the composition may be incorporated with ordinary diorganopolysiloxane etc., in an amount which would not be harmful to the features of the composition.

The composition of the present invention is cured by irradiation with ultraviolet light. The sources for ultraviolet light include, for example, UV fluorescent lamp, low-pressure mercury vapor lamp, high-pressure mer-

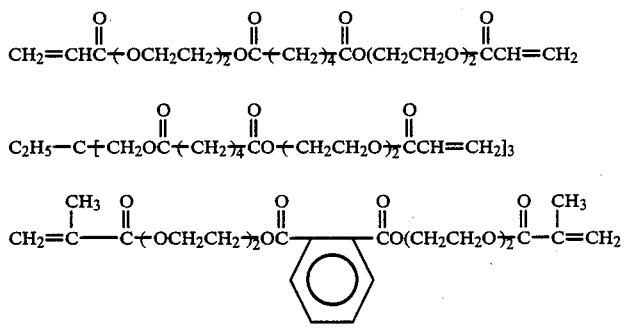

The composition of the present invention should contain 50 to 99 parts by weight, preferably 50 to 80 parts by weight of the component (A), and 50 to 1 parts by weight, preferably 50 to 20 parts by weight of the component (B), so that the total of the components (A) and (B) should be 100 parts by weight.

With component (B) in excess of 50 parts by weight, or with component (B) in excess of component (A), the resulting composition is composed mainly of the acrylate or methacrylate of the formula (2) and hence provides a cured product which is poor in heat resistance, flexibility, and weather resistance.

The composition of the present invention contains a photoinitiator as component (C). It includes a variety of known compounds, for example, acetophenone, propiophenone, xanthone, fluorenone, benzaldehyde, fluorene, anthraquinone, triphenylamine, carbazole, 3-methylacetophenone, 4-chlorobenzophenone, 4,4'-dimethoxybenzophenone, and N,N,N',N'-tetramethyl-4,4'-diaminobenzophenone (Michler's ketone). Additional examples which have good miscibility with organopolysiloxane include organosilicon-containing benzophenone derivative disclosed in Japanese Patent Publication No. 48794/1976, and organosilicon-containing cury vapor lamp, xenon lamp, carbon arc lamp, and artificial sunlight. The exposure may be properly selected.

A preferred source for ultraviolet rays for use herein is one having an output per unit length of from 80 to 160 W/cm, a dominant wavelength of about 365 nm and a wavelength range of from about 230 to about 450 nm. The irradiation time may be no more than one second per each lamp having an electrical power input of 160 W/cm.

The ultraviolet-curable composition of the present invention provides a hard coating having good scratch resistance because it is composed of acrylic-functional organopolysiloxane as component (A) and acrylate or methacrylate of formula (2) as component (B). The hard coating is also superior in durability, solvent resistance, flexibility, and heat resistance. Therefore, the composition is suitable for use as protective coating of printed circuits, integrated circuits, and other wiring. It also finds use as a coating agent for thermoplastic substrates (such as polycarbonate, polymethyl methacrylate, and polyether imide) and glass sleeves.

To further illustrate the invention, and not by way of limitation, the following examples and comparative examples are given.

EXAMPLE 1

In a 1-liter four-necked flask were placed 218 g (1 mol) of γ-acryloylpropylmethyldimethoxysilane, 297 g (1.5 mol) of phenyltrimethoxysilane, and 300 g (2.5 mol) of dimethyldimethoxysilane. To the flask was added dropwise 124.2 g (6.9 mol) of 0.2 wt % aqueous solution of hydrochloric acid. During the dropwise addition, the flask was cooled to cope with exothermic reaction, so that the reactants were kept at 25° to 30° C. After the dropwise addition, the reactants were heated. The reaction product was freed of methanol at 70° C. through an ester adaptor. When the internal temperature reached 90° C., the flask was cooled. The reaction product was washed with water to separate the waste acid. The low-boiling fraction was stripped out. Thus there was obtained 540 g (94% yield) of acrylic-functional organopolysiloxane I having a viscosity of 1845 cSt (25° C.) and a refractive index of $n_D^{25} = 1.4811$.

An ultraviolet-curable composition was prepared from 80 parts by weight of the thus obtained acrylic-functional organopolysiloxane I, 20 parts by weight of trimethylolpropane triacrylate, and 4 parts by weight of benzoin isobutylether. The resulting mixture was applied (in coating thickness of 20 μm) onto a polycarbonate substrate. The coating was exposed to ultraviolet light for curing. The exposure was accomplished by moving the coated substrate at a rate of 5 m/min under a high-pressure mercury vapor lamp (80 W/cm) placed 8 cm away.

The cured coating film was found to have a hardness equivalent to a pencil hardness of 3H. The cured coating film also exhibited good adhesion to the polycarbonate substrate according to the cross-cut Erichsen test (100/100).

For comparison, the acrylic-functional organopolysiloxane I and trimethylolpropane triacrylate were individually cured with benzoin isobutylether in the same manner as above. The former gave a coating film which exhibited good adhesion of 100/100 in cross-cut test; but the coating film has a low hardness equivalent to a pencil hardness of HB. The latter gave a tacky coating film on account of incomplete curing.

EXAMPLE 2

In a 1-liter four-necked flask were placed 43.6 g (0.2 mol) of γ-acryloylpropylmethoxysilane, 118.8 g (0.6 mol) of phenyltrimethoxysilane, 72 g (0.6 mol) of dimethyldimethoxysilane, and 146.4 g (0.6 mol) of diphenyldimethoxysilane. To the flask was added dropwise 41.4 g (2.3 mol) of 0.2 wt % aqueous solution of hydrochloric acid in the same procedure as Example 1. The reaction product was freed of methanol at 70° C. through an ester adaptor. When the internal temperature reached 90° C., the flask was cooled. The reaction product was washed with water to separate waste acid. The low-boiling fraction was stripped off. Thus there was obtained 270 g (97% yield) of acrylic-functional organopolysiloxane II having a viscosity of 18400 cSt (25° C.) and a refractive index of $n_D^{25} = 1.5542$.

An ultraviolet-curable composition was prepared from 70 parts by weight of the thus obtained acrylic-functional organopolysiloxane II, 30 parts by weight of pentaerythritol triacrylate, 20 parts by weight of calcium carbonate, and 4 parts by weight of acetophenone. After uniform dispersion by a three-roll mill, the mixture was applied (in coating thickness of 25 μm) onto a copper-clad polyimide film. The coating was exposed to ultraviolet light for curing in the same manner as in Example 1.

The cured coating film was found to have good adhesion to the copper foil, good flexibility, and good solder heat resistance (in dipping test at 260° C. for 10 seconds).

For comparison, the acrylic-functional organopolysiloxane II and pentaerythritol triacrylate were individually made into a composition by adding calcium carbonate and acetophenone in the same amount as in Example 1 for 100 parts by weight. The composition was evaluated in the same manner as above. The former gave a coating film which exhibits good adhesion and flexibility but lacks hardness (pencil hardness of HB) and scratch resistance. The latter gave a coating film which cracked in the solder heat resistance test on account of insufficient flexibility.

EXAMPLE 3

In a 1-liter four-necked flask were placed 117 g (0.5 mol) of γ-acryloylpropylmethoxysilane, 226.3 g (0.06 mol) of α-ω-dichloromethylpolysiloxane (90 cSt at 25° C.), and 297 g (1.5 mol) of phenyltrimethoxysilane. To the reactants was added dropwise 72 g (4 mol) of water to effect hydrolysis. The flask was cooled with stirring to keep the reactants below 30° C. The reactants were heated at 50° to 60° C. for 2 hours. The reaction product was washed with water to remove waste acid and the low-molecular-weight substances were stripped off. Thus there was obtained 473 g of acrylic-functional organopolysiloxane III having a viscosity of 8650 cSt.

An ultraviolet-curable composition was prepared from 50 parts by weight of the thus obtained acrylic-functional organopolysiloxane III, 50 parts by weight of tetraethylene glycol diacrylate, and 1 parts by weight of 4-methoxybenzophenol. After uniform mixing, the mixture was applied (in coating thickness of 100 μm) onto a stainless steel plate. The coating was exposed to ultraviolet light for curing in the same manner as in Example 1.

The cured coating film was a good elastomeric substance having a compressive ratio of 10.3%, a recovery ratio of 82%, and an oil resistance of ΔW=5.0% (JIS No. 3 oil, at 150° C. for 3 hours).

It is noted from the results of Example 1 to 3 mentioned above that the composition of the present invention provides a coating film which is superior in scratch resistance, adhesion, flexibility, solder heat resistance, and oil resistance. Thus, it is free of the disadvantages involved in the conventional ultraviolet-curable organopolysiloxane composition.

What is claimed is:

1. An ultraviolet-curable composition which comprises:
(A) an acrylic-functional organopolysiloxane containing at least one phenyl group containing siloxane unit and at least one acrylic-functional siloxane unit represented by formula (1) below

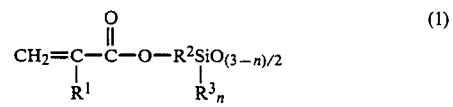

where $R^1$ denotes a hydrogen atom or methyl group; $R^2$ denotes a substituted or unsubstituted divalent hydrocarbon group having 1 to 12 carbon atoms; $R^3$ denotes a substituted or unsubstituted monovalent hydrocarbon group having 1 to 12 carbon atoms; and n is a numeral of 0 or 1,

- (B) a acrylate or methacrylate selected from the group consisting of diethylene glycol diacrylate or dimethacrylate, tetraethylene glycol diacrylate or dimethacrylate, trimethylolpropane triacrylate or trimethacrylate, pentaerythriol triacrylate or trimethacrylate and a mixture thereof,
  - the amount of said (A) being in the range of 50 to 80 parts by weight and the amount of said (B) being in the range of 50 to 20 parts by weight, wherein the total weight of (A) and (B) is 100 parts by weight, and
- (C) a photoinitiator in an amount of 0.1 to 10 parts by weight per 100 parts by weight of the total amount of (A) and (B), and wherein the composition is curable by irradiation with ultraviolet light.

2. The composition as claimed in claim 1, wherein $R^2$ of formula (1) is alkylene.

3. The composition as claimed in claim 1, wherein $R^2$ of formula (1) is methylene, ethylene, triethylene or tetramethylene.

4. The composition as claimed in claim 1, wherein $R^3$ of formula (1) is alkyl, alkenyl, aryl or cycloalkyl.

5. The composition as claimed in claim 1, wherein $R^3$ of formula (1) is methyl, ethyl, propyl or butyl.

6. The composition as claimed in claim 1, wherein $R^3$ of formula (1) is vinyl or allyl.

7. The composition as claimed in claim 1, wherein $R^3$ of formula (1) is phenyl or tolyl.

8. The composition as claimed in claim 1, wherein $R^3$ of formula (1) is cyclohexyl.

9. The composition as claimed in claim 1, wherein $R^3$ of formula (1) is chloromethyl, trifluoropropyl or cyanoethyl.

10. The composition as claimed in claim 1, wherein said phenyl group containing siloxane unit is represented by formula $$PhR_n^6SiO_{\frac{3-n}{2}} \quad (3)$$

or $$Ph_2R_m^6SiO_{\frac{3-m}{2}} \quad (4)$$

where Ph represents a phenyl group, $R^6$ represents the same or different, substituted or unsubstituted monovalent hydrocarbon groups having 1 to 12 carbon atoms, n is 0, 1 or 2 and m is 0 or 1.

* * * * *